(12) United States Patent
Mei et al.

(10) Patent No.: US 11,565,201 B1
(45) Date of Patent: Jan. 31, 2023

(54) AUTOMATIC FLUSHING DEVICE FOR SCREEN FILTER OF BIOGAS SLURRY DRIP IRRIGATION SYSTEM AND USE THEREOF

(71) Applicant: INSTITUTE OF ENVIRONMENT AND SUSTAINABLE DEVELOPMENT IN AGRICULTURE, CAAS, Beijing (CN)

(72) Inventors: Xurong Mei, Beijing (CN); Jiandong Wang, Beijing (CN); Haitao Wang, Beijing (CN); Chuanjuan Wang, Beijing (CN); Xuefeng Qiu, Beijing (CN); Weiping Hao, Beijing (CN); Daozhi Gong, Beijing (CN); Haoru Li, Beijing (CN)

(*) Notice: Subject to any disclaimer, the term of this patent is extended or adjusted under 35 U.S.C. 154(b) by 0 days.

(21) Appl. No.: 17/828,048

(22) Filed: May 31, 2022

(30) Foreign Application Priority Data

Sep. 26, 2021 (CN) .......................... 202111125134.2

(51) Int. Cl.
| | |
|---|---|
| *B01D 29/72* | (2006.01) |
| *B01D 29/11* | (2006.01) |
| *B01D 29/66* | (2006.01) |
| *B01D 29/90* | (2006.01) |
| *B01D 29/92* | (2006.01) |
| *B01D 29/60* | (2006.01) |
| *B01D 37/04* | (2006.01) |

(Continued)

(52) U.S. Cl.
CPC .............. *B01D 29/72* (2013.01); *B01D 29/11* (2013.01); *B01D 29/606* (2013.01); *B01D 29/66* (2013.01); *B01D 29/902* (2013.01); *B01D 29/904* (2013.01); *B01D 29/925* (2013.01); *B01D 37/046* (2013.01); *A01C 23/042* (2013.01); *C05F 3/00* (2013.01)

(58) Field of Classification Search
CPC ........ B01D 29/72; B01D 29/23; B01D 29/35; B01D 29/606
See application file for complete search history.

(56) References Cited

U.S. PATENT DOCUMENTS

| | | | | |
|---|---|---|---|---|
| 2014/0230383 | A1* | 8/2014 | Steiner | .................... B01D 46/90 55/350.1 |
| 2014/0338293 | A1* | 11/2014 | Williams | ............... B01D 35/12 55/482 |

FOREIGN PATENT DOCUMENTS

| | | |
|---|---|---|
| CN | 101670201 A | 3/2010 |
| CN | 202833439 U | 3/2013 |

(Continued)

*Primary Examiner* — Benjamin M Kurtz

(57) ABSTRACT

An automatic flushing device for a screen filter of a biogas slurry drip irrigation system and a use thereof are provided. The automatic flushing device includes a feeding mechanism, a filter unit, a discharging mechanism and a control mechanism, where the filter unit is provided with a feeding end fixedly threaded to a discharging end of the feeding mechanism and a discharging end fixedly threaded to a feeding end of the discharging mechanism; and the control mechanism is clamped on a pipe of the feeding mechanism. The automatic flushing device enhances the cleaning strength and uniformity of ultrasonic waves to the filter screen. The ultrasonic vibration rod is nested inside the upper filter casing through the externally-threaded hollow cap and a threaded top portion of the upper filter casing, which greatly facilitates the cleaning, replacement and maintenance of the ultrasonic vibration rod.

5 Claims, 5 Drawing Sheets

(51) Int. Cl.
*C05F 3/00* (2006.01)
*A01C 23/04* (2006.01)

(56) References Cited

FOREIGN PATENT DOCUMENTS

| | | | |
|---|---|---|---|
| CN | 103212235 A | | 7/2013 |
| CN | 103285646 A | | 9/2013 |
| CN | 103611362 A | | 3/2014 |
| CN | 103638770 A | | 3/2014 |
| CN | 103639044 A | | 3/2014 |
| CN | 103691244 A | | 4/2014 |
| CN | 106457084 A | | 2/2017 |
| CN | 113173664 A | | 7/2021 |
| GB | 2 371 246 | * | 7/2002 |

* cited by examiner

AUTOMATIC FLUSHING DEVICE FOR SCREEN FILTER OF BIOGAS SLURRY DRIP IRRIGATION SYSTEM AND USE THEREOF

CROSS REFERENCE TO THE RELATED APPLICATIONS

This application is based upon and claims priority to Chinese Patent Application No. 202111125134.2, filed on Sep. 26, 2021, the entire contents of which are incorporated herein by reference.

TECHNICAL FIELD

The present disclosure relates to the technical field of intelligent processing equipment for production of energy and environmental protection, and in particular to an automatic flushing device for a screen filter of a biogas slurry drip irrigation system and a use thereof. Specifically, it relates to a self-cleaning technology to prevent the filter screen from clogging due to sedimentation and adhesion.

BACKGROUND

Biogas slurry produced in the farm is a kind of waste water with high conductivity and chemical oxygen demand (COD). A dairy farm with a herd size of less than 10,000 cows can produce up to 500 cubic meters of biogas slurry per day. If the biogas slurry is directly discharged into the field, it will have significant negative effects on soil and crops. Considering that biogas slurry is rich in nutrients such as nitrogen and amino acids, it can be mixed with water to form an organic fertilizer to be applied to the field through a drip irrigation system, so a biogas slurry drip irrigation system is established.

During the operation of the biogas slurry drip irrigation system, when the flow rate and application concentration of the biogas slurry are high, the traditional screen filter or disc filter will be clogged within a few minutes, resulting in the paralysis of the drip irrigation system. The substances such as sludge, macromolecular organic matter and microorganisms that are viscous and prone to clog in the complex composition of the biogas slurry put forward high requirements on the performance of the filter. The existing self-flushing filters (Patent Nos. 201310081243.8, 201580029407.X and 201310250878.6) only use hydraulic shearing methods such as water flow impact and centrifugal suction, which cannot eradicate the viscous substances in the filter screen or disc.

It has been found through an experiment that ultrasonic waves can effectively remove the viscous impurities attached to the filter. The ultrasonic filters in the prior art (Patent Nos. ZL201310720645.8, ZL201310720672.5 and ZL201310720825.6) are often electrostatic filters (air filters), which effectively filter the air by charging particles with a high-voltage electrostatic field and trapping them by a dust collection plate. However, they have little effect on electrostatic filtration of impurities in liquids. In addition, the ultrasonic cleaning filter (Patent No. ZL200810042634.8) has problems such as low cleaning efficiency, inability to self-clean and inconvenient maintenance, making it fail to be maturely applied to the biogas slurry drip irrigation system.

Other existing treatment processes (for example, Patent No. CN2021103245867) have been applied to biogas slurry drip irrigation to filter impurities such as sludge through a filter screen, to improve the irrigation uniformity and purity. However, the filter screen will still be clogged due to sediment adhesion after long-term operation. Some of the existing solutions use back-up drip irrigation filtration systems. When one of the drip irrigation filtration systems is clogged, it is closed for repair and switched to the other drip irrigation filtration system to work, and it is switched back after finishing repair. The two drip irrigation filtration systems work independently. However, when the clogged drip irrigation filtration system is directly switched after repair, the biogas slurry in the repaired drip irrigation filtration system is directly discharged, which often makes the quality of water discharged in the early stage unqualified. Ultrasonic vibration is a method based on physical inertia, and sludge and waste will inevitably remain on the filter screen, so the water directly discharged from the repaired drip irrigation filtration system is impure and non-uniform.

To this end, the present disclosure proposes an automatic flushing device for a screen filter of a biogas slurry drip irrigation system and a method thereof.

SUMMARY

In order to solve the problem that the existing traditional filter is not suitable for the biogas slurry drip irrigation system, an objective of the present disclosure is to propose an automatic flushing device for a screen filter of a biogas slurry drip irrigation system. The automatic flushing device includes a feeding mechanism, a filter unit, a discharging mechanism and a control mechanism; the filter unit is provided with a feeding end fixedly threaded to a discharging end of the feeding mechanism and a discharging end fixedly threaded to a feeding end of the discharging mechanism; and the control mechanism is clamped on a pipe of the feeding mechanism;

the feeding mechanism includes a main feeding pipe, a pressure regulating valve, a first feeding pipe, a second feeding pipe, a first feeding solenoid valve and a second feeding solenoid valve; the first feeding solenoid valve is fixedly connected to an outlet of the pressure regulating valve through a feeding tee joint; the second feeding solenoid valve is fixedly connected to one end of the feeding tee joint through a feeding elbow; the first feeding solenoid valve and the second feeding solenoid valve are arranged in parallel; and the first feeding solenoid valve and the second feeding solenoid valve are respectively connected to the first feeding pipe and the second feeding pipe;

the filter unit includes a first filter unit and a second filter unit; an ultrasonic generator is fixedly provided between the first filter unit and the second filter unit; and the first feeding pipe is connected to the first filter unit, and the second feeding pipe is connected to the second filter unit;

the discharging mechanism includes a first discharging pipe, a second discharging pipe, a main discharging pipe, a first discharging solenoid valve, a second discharging solenoid valve, a discharging elbow, a discharging tee joint and a pressure transmitter; the pressure transmitter is provided on the main discharging pipe; the first discharging solenoid valve and the second discharging solenoid valve are respectively connected to the first discharging pipe and the second discharging pipe; the first discharging pipe and the second discharging pipe are respectively connected to an input end of the discharging elbow and one input end of the discharging tee joint; the first discharging pipe further connects an output end of the discharging elbow to the other input end of the discharging tee joint; and an output end of the discharging tee joint is connected to the main discharging pipe;

the control mechanism is electrically connected to the first feeding solenoid valve, the second feeding solenoid valve, the first discharging solenoid valve, the second discharging solenoid valve, the ultrasonic generator, the pressure transmitter, a blow-down solenoid valve and a first electronically-controlled on-off valve; the first feeding solenoid valve and the first discharging solenoid valve are responsible for opening and closing the first filter unit, and are normally open by default; and the second feeding solenoid valve and the second discharging solenoid valve are responsible for opening and closing the second filter unit, and are normally closed by default;

a first communication pipe for communicating the first discharging pipe with the second feeding pipe is provided between the first discharging pipe and the second feeding pipe; the first communication pipe is provided thereon with the first electronically-controlled on-off valve; a second communication pipe for communicating the second discharging pipe with the first feeding pipe is provided between the second discharging pipe and the first feeding pipe; and the second communication pipe is provided thereon with a second electronically-controlled on-off valve;

the first filter unit has a same structure as the second filter unit; the first filter unit includes an externally-threaded hollow cap, an ultrasonic vibration rod, an upper filter casing, a filter screen, a lower filter casing and a blow-down solenoid valve; and the ultrasonic vibration rod is electrically connected to the ultrasonic generator;

the ultrasonic vibration rod is threaded to a top portion of the upper filter casing; and the ultrasonic vibration rod has a baffle diameter the same as an outer diameter of the externally-threaded hollow cap and a length the same as a length of the filter screen;

the filter screen is inserted into a slot of the lower filter casing and extends to the top portion of the upper filter casing; and the filter screen has a mesh number of 120-150;

the lower filter casing is provided with a "cross-shaped" flow channel, in which a fluid entering from a water inlet flows from an inside out through the filter screen to a water outlet, and a drain outlet is communicated with the water inlet;

the pressure transmitter is able to transmit a measurement signal wirelessly;

the first communication pipe and the second communication pipe have a same bore diameter; and the electronically-controlled on-off valve is a solenoid valve.

A working method of the automatic flushing device for a screen filter of a biogas slurry drip irrigation system specifically includes the following steps:

S1: rotating the pressure regulating valve to make the pressure transmitter display a common working pressure 0.1 MPa of the drip irrigation system, that is, activating a filtering mode of the first filter unit while keeping the second filter unit in an idle mode; and opening the first feeding solenoid valve, and closing the second feeding solenoid valve, the second discharging solenoid valve, the first discharging solenoid valve and the ultrasonic generator;

S2: opening the first electronically-controlled on-off valve for a certain period of time T; allowing, during the period of time T, a fluid filtered by the first filter unit to flow through the first discharging pipe, the first communication pipe and the second feeding pipe in sequence to fill the second filter unit and then enter the second discharging pipe, until the first communication pipe, the second feeding pipe, the second filter unit and the second discharging pipe are filled; opening the first discharging solenoid valve, such that all the fluid filtered by the first filter unit flows from the first discharging pipe into the main discharging pipe; and closing the first electronically-controlled on-off valve on the first communication pipe;

S3: determining that the first filter unit is clogged when the pressure transmitter displays a value less than a specific value 0.06 Mpa set by the control mechanism; closing the first discharging solenoid valve and the first feeding solenoid valve in sequence, such that the upper filter casing of the first filter unit is filled with water; and turning on the ultrasonic generator to activate a self-cleaning mode of the first filter unit;

S4: opening, if the self-cleaning mode of the first filter unit is about to be ended in a short period of time (less than 10 minutes), the second discharging solenoid valve, such that the water originally filled through the first communication pipe flows out into the main discharging pipe for subsequent drip irrigation without opening the first discharging solenoid valve; discharging, by the blow-down solenoid valve, an impurity cleaned inside the first filter unit, after the first filter unit is cleaned; and directly opening the first feeding solenoid valve and the first discharging solenoid valve, closing the second discharging solenoid valve, and turning off the ultrasonic generator; and opening the second feeding solenoid valve and the second discharging solenoid valve if the self-cleaning mode of the first filter unit is not about to be ended in a short period of time (less than 10 minutes); opening, after the first filter unit is cleaned for 10-30 minutes, the blow-down solenoid valve to discharge the impurity cleaned inside the first filter unit so as to complete cleaning; turning off the ultrasonic generator, and proceeding to a mixed mode: closing the second feeding solenoid valve, and opening the first feeding solenoid valve, the first electronically-controlled on-off valve and the second discharging solenoid valve, such that the water filtered by the first filter unit enters the second feeding pipe through the first communication pipe to be filtered again by the second filter unit, and then flows out through the second discharging pipe; and opening, after 1 minute, the first discharging solenoid valve, and closing the first electronically-controlled on-off valve and the second discharging solenoid valve; and S5: repeating steps S2 to S4 by activating the second filter unit when the pressure transmitter again displays a value less than 0.06 MPa; and allowing, after a half-year maintenance cycle, the first feeding solenoid valve and the first discharging solenoid valve to be responsible for opening and closing the first filter unit, and to be normally open by default; and allowing the second feeding solenoid valve and the second discharging solenoid valve to be responsible for opening and closing the second filter unit, and to be normally closed by default.

Compared with the prior art, the present disclosure has the following beneficial effects.

1. The present disclosure adds the controllable first communication pipe and the electronically controlled on-off valve on the basis of a traditional dual-channel filtration system. Therefore, one of the filter channels can be used for secondary filtration of part of the mixed liquid filled in the other filter channel after cleaning. In addition, the fluid pre-stored in the communication pipe can be used as a back-up drip irrigation liquid in case of an emergency situation.

2. The present disclosure enhances the cleaning strength and uniformity of ultrasonic waves to the filter screen. The ultrasonic vibration rod is nested inside the upper filter casing through the externally-threaded hollow cap and the threaded top portion of the upper filter casing, which greatly facilitates the cleaning, replacement and maintenance of the ultrasonic vibration rod.

3. The present disclosure operates two filter units alternately, which ensures the self-flushing function of the filter and greatly improves the operation stability of the biogas slurry drip irrigation system.

Figure 1:
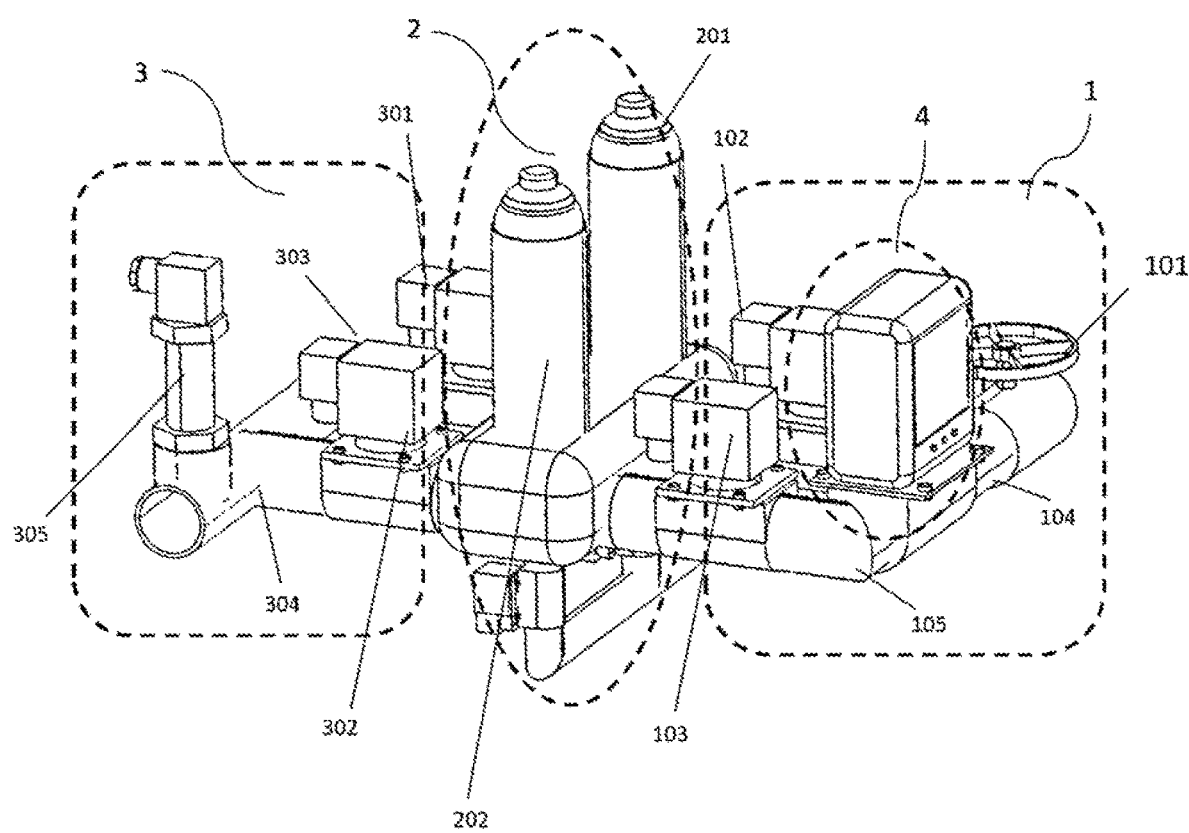
FIG. 1 is a schematic diagram illustrating an overall structure of an automatic flushing device for a screen filter of a biogas slurry drip irrigation system according to the present disclosure.

Reference Numerals: 1. feeding mechanism; 101. pressure regulating valve; 102. first feeding solenoid valve; 103. second feeding solenoid valve; 104. feeding tee joint; 105. feeding elbow; 2. filter unit; 201. first filter unit; 20101. externally-threaded hollow cap; 20102. ultrasonic vibration rod; 20103. upper filter casing; 20104. filter screen; 20105. lower filter casing; 20106. blow-down solenoid valve; 202. second filter unit; 203. ultrasonic generator; 3. discharging mechanism; 301. first discharging solenoid valve; 302. second discharging solenoid valve; 303. discharging elbow; 304. discharging tee joint; 305. pressure transmitter; and 4. control mechanism; 501. first communication pipe; 502. second communication pipe; 601. first electronically-controlled on-off valve; and 602. second electronically-controlled on-off valve.

DETAILED DESCRIPTION OF THE EMBODIMENTS

The technical solutions of the embodiments of the present disclosure are clearly and completely described below with reference to the drawings. Apparently, the described embodiments are merely a part rather than all of the embodiments of the present disclosure. All other embodiments obtained by a person of ordinary skill in the art based on the embodiments of the present disclosure without creative efforts should fall within the protection scope of the present disclosure.

It should be understood that, in the description of the present disclosure, the terms such as "upper", "lower", "front", "rear", "left", "right", "vertical", "horizontal", "top", "bottom", "inner" and "outer" are intended to indicate orientations shown in the drawings. It should be noted that these terms are merely intended to facilitate and simplify the description of the present disclosure, rather than to indicate or imply that the mentioned apparatus or elements must have the specific orientation or be constructed and operated in the specific orientation. Therefore, these terms may not be construed as a limitation to the present disclosure.

In addition, it should be understood that, for ease of description, the dimensions of the various components shown in the drawings are not drawn to actual scale. For example, the thickness or width of some layers may be exaggerated relative to other layers.

It should be noted that similar reference numerals and letters represent similar items in the drawings below. Therefore, once an item is defined or described in one drawing, it does not need to be further defined and described in subsequent drawings.

Figure 2:
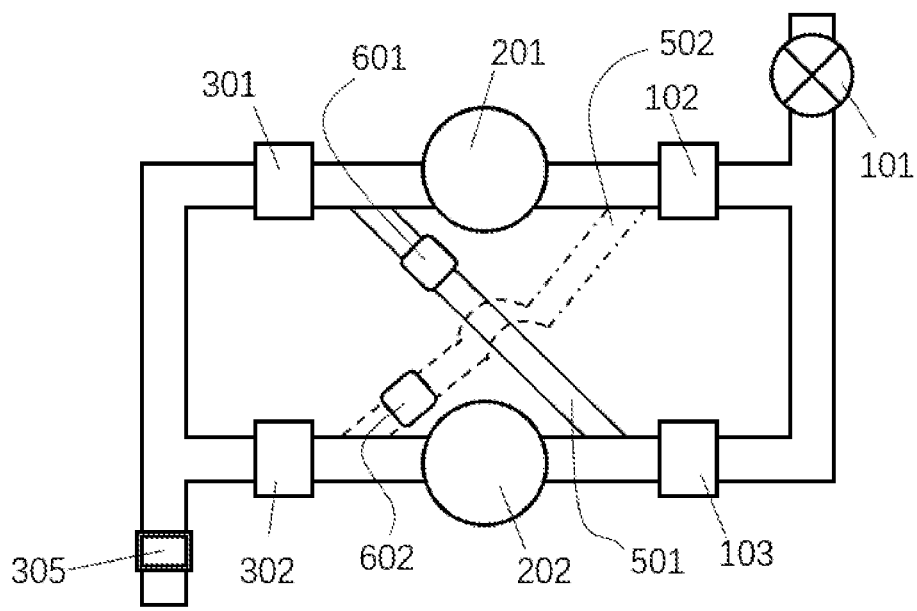
FIG. 2 is a schematic diagram illustrating a pipe connection of an automatic flushing device for a screen filter of a biogas slurry drip irrigation system according to the present disclosure.
Figure 3:
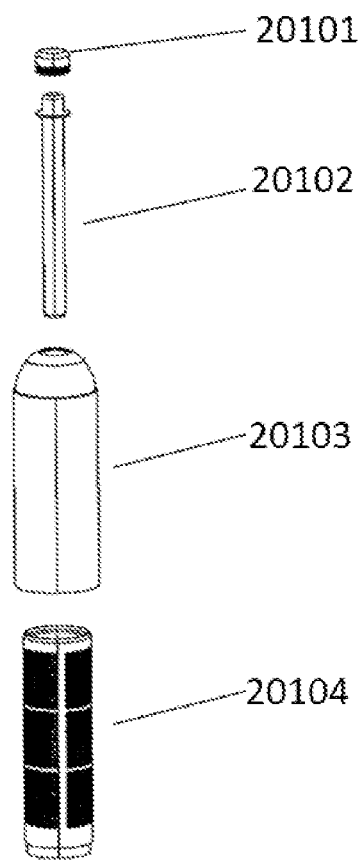
FIG. 3 is a schematic diagram illustrating an upper half part of a first filter unit according to the present disclosure.
Figure 4:
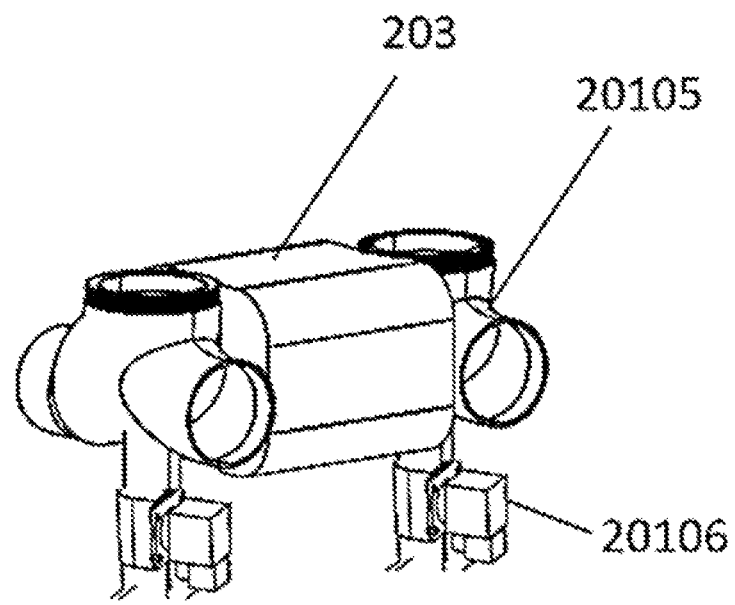
FIG. 4 is a structural diagram illustrating a lower half part of the first filter unit and an ultrasonic generator according to the present disclosure.
Figure 5:
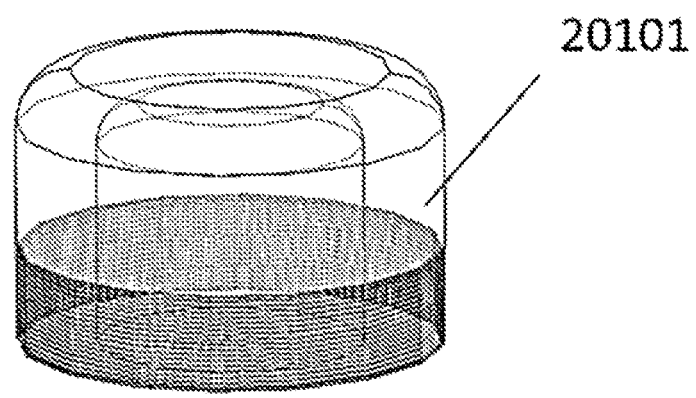
FIG. 5 is a structural diagram of an externally-threaded hollow cap according to the present disclosure.
Figure 6:
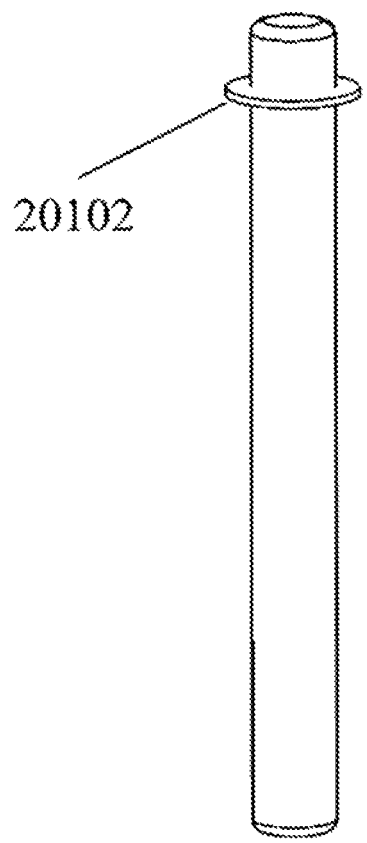
FIG. 6 is a structural diagram of an ultrasonic vibration rod according to the present disclosure.
Figure 7:
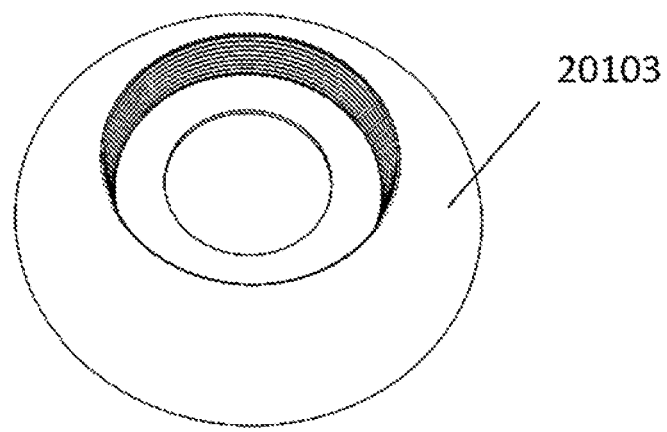
FIG. 7 is a schematic diagram illustrating a top structure of an upper filter casing of the filter according to the present disclosure.
Figure 8:
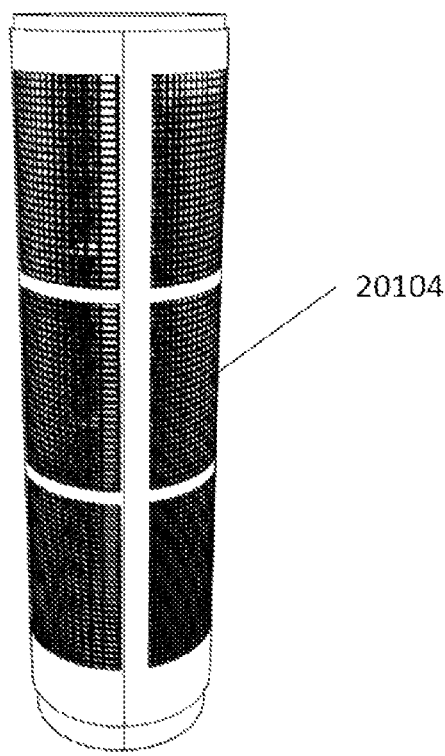
FIG. 8 is a structural diagram of a filter screen according to the present disclosure.
Figure 9:
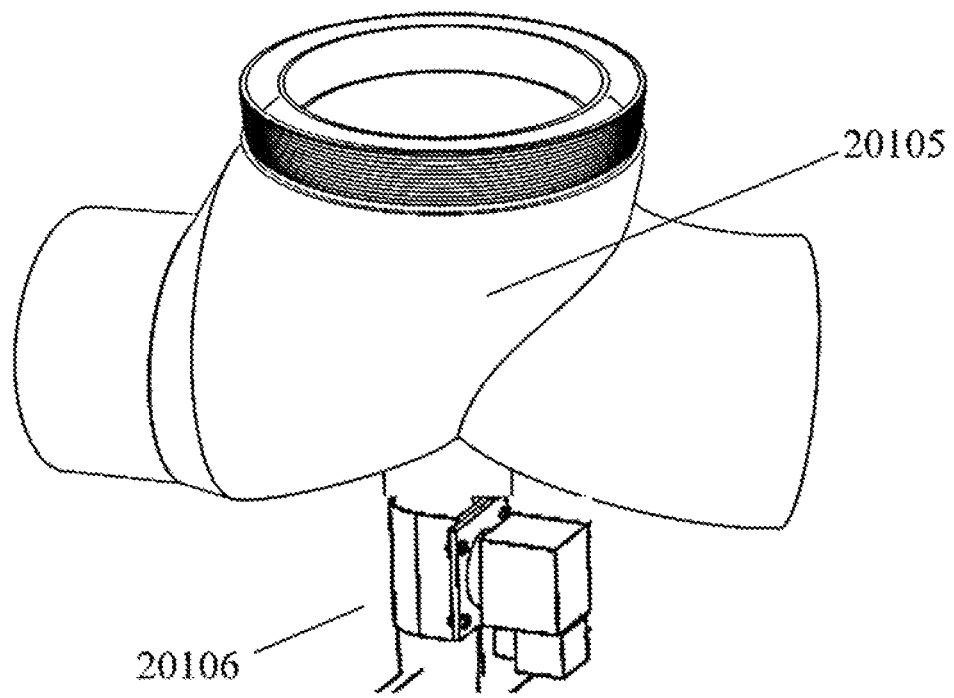
FIG. 9 is a structural diagram of a lower filter casing of the filter according to the present disclosure.

As shown in FIGS. 1 to 9, the present disclosure provides a technical solution: an automatic flushing device for a screen filter of a biogas slurry drip irrigation system. The automatic flushing device includes a feeding mechanism 1, a filter unit 2, a discharging mechanism 3 and a control mechanism 4. A discharging end of the feeding mechanism 1 is fixedly threaded to a feeding end of the filter unit 2. A discharging end of the filter unit 2 is fixedly threaded to a feeding end of the discharging mechanism 3. The control mechanism 4 is clamped on a pipe of the feeding mechanism 1.

The feeding mechanism 1 includes a main feeding pipe, a pressure regulating valve 101, a first feeding pipe, a second feeding pipe, a first feeding solenoid valve 102 and a second feeding solenoid valve 103. The first feeding solenoid valve 102 is fixedly connected to an outlet of the pressure regulating valve 101 through a feeding tee joint 104. The second feeding solenoid valve 103 is fixedly connected to one end of the feeding tee joint 104 through a feeding elbow 105. The first feeding solenoid valve 102 and the second feeding solenoid valve 103 are arranged in parallel. The first feeding solenoid valve 102 and the second feeding solenoid valve 103 are respectively connected to the first feeding pipe and the second feeding pipe.

The filter unit 2 includes a first filter unit 201 and a second filter unit 202. An ultrasonic generator 203 is fixedly provided between the first filter unit 201 and the second filter unit 202. The first feeding pipe is connected to the first filter unit 201, and the second feeding pipe is connected to the second filter unit 202.

The discharging mechanism 3 includes a first discharging pipe, a second discharging pipe, a main discharging pipe, a first discharging solenoid valve 301, a second discharging solenoid valve 302, a discharging elbow 303, a discharging tee joint 304 and a pressure transmitter 305. The pressure transmitter 305 is provided on the main discharging pipe. The first discharging solenoid valve 301 and the second discharging solenoid valve 302 are respectively connected to the first discharging pipe and the second discharging pipe. The first discharging pipe and the second discharging pipe are respectively connected to an input end of the discharging elbow 303 and one input end of the discharging tee joint. The first discharging pipe further connects an output end of the discharging elbow 303 to the other input end of the discharging tee joint 304. An output end of the discharging tee joint 304 is connected to the main discharging pipe.

The control mechanism 4 is electrically connected to the first feeding solenoid valve 102, the second feeding solenoid valve 103, the first discharging solenoid valve 301, the second discharging solenoid valve 302, the ultrasonic generator 203, the pressure transmitter 305, a blow-down solenoid valve 20106 and a first electronically-controlled on-off valve. The first feeding solenoid valve 102 and the first discharging solenoid valve 301 are responsible for opening and closing the first filter unit 201, and are normally open by default. The second feeding solenoid valve 103 and the second discharging solenoid valve 302 are responsible for opening and closing the second filter unit 202, and are normally closed by default.

A first communication pipe for communicating the first discharging pipe with the second feeding pipe is provided between the first discharging pipe and the second feeding pipe. The first communication pipe is provided thereon with the first electronically-controlled on-off valve. A second communication pipe for communicating the second discharging pipe with the first feeding pipe is provided between the second discharging pipe and the first feeding pipe. The second communication pipe is provided thereon with a second electronically-controlled on-off valve.

The filter unit 2 includes the first filter unit 201 and the second filter unit 202. The ultrasonic generator 203 is fixedly provided between the first filter unit 201 and the second filter unit 202. The first filter unit 201 has a same structure as the second filter unit 202. The first filter unit 201 includes an externally-threaded hollow cap 20101, an ultrasonic vibration rod 20102, an upper filter casing 20103, a filter screen 20104, a lower filter casing 20105 and a blow-down solenoid valve 20106. The ultrasonic vibration rod 20102 is electrically connected to the ultrasonic generator 203, and the ultrasonic vibration rod 20102 is threaded to a top portion of the upper filter casing 20103. The ultrasonic vibration rod has a baffle diameter the same as an outer diameter of the externally-threaded hollow cap 20101 and a length the same as a length of the filter screen 20104. The filter screen 20104 is inserted into a slot of the lower filter casing and extends to the top portion of the upper filter casing 20103. The filter screen 20104 has a mesh number of 120-150. The lower filter casing 20105 is provided with a "cross-shaped" flow channel, in which a fluid entering from a water inlet flows from an inside out through the filter screen 20104 to a water outlet, and a drain outlet is communicated with the water inlet.

The discharging mechanism 3 includes a first discharging solenoid valve 301, a second discharging solenoid valve 302, a discharging elbow 303, a discharging tee joint 304 and a pressure transmitter 305. The pressure transmitter 305 is able to transmit a measurement signal wirelessly. The first communication pipe and the second communication pipe have a same bore diameter. The electronically-controlled on-off valve is a solenoid valve.

A working method of the automatic flushing device for a screen filter of a biogas slurry drip irrigation system specifically includes the following steps:

S1: Rotate the pressure regulating valve 101 to make the pressure transmitter 305 display a common working pressure 0.1 MPa of the drip irrigation system, that is, activate a filtering mode of the first filter unit 201 while keeping the second filter unit 202 in an idle mode; and open the first feeding solenoid valve 102, and close the second feeding solenoid valve 103, the second discharging solenoid valve 302, the first discharging solenoid valve 301 and the ultrasonic generator 203.

S2: Open the first electronically-controlled on-off valve for a certain period of time T; allow, during the period of time T, a fluid filtered by the first filter unit 201 to flow through the first discharging pipe, the first communication pipe and the second feeding pipe in sequence to fill the second filter unit 202 and then enter the second discharging pipe, until the first communication pipe, the second feeding pipe, the second filter unit and the second discharging pipe are filled; open the first discharging solenoid valve 301, such that all the fluid filtered by the first filter unit 201 flows from the first discharging pipe into the main discharging pipe; and close the first electronically-controlled on-off valve on the first communication pipe.

S3: Determine that the first filter unit 201 is clogged when the pressure transmitter 305 displays a value less than a specific value 0.06 Mpa set by the control mechanism 4; close the first discharging solenoid valve 301 and the first feeding solenoid valve 102 in sequence, such that the upper filter casing of the first filter unit 201 is filled with water; and turn on the ultrasonic generator 203 to activate a self-cleaning mode of the first filter unit 201.

S4: Open, if the self-cleaning mode of the first filter unit 201 is about to be ended in a short period of time (less than 10 minutes), the second discharging solenoid valve 302, such that the water originally filled through the first communication pipe flows out into the main discharging pipe for subsequent drip irrigation without opening the first discharging solenoid valve 301; discharge, by the blow-down solenoid valve 20106, an impurity cleaned inside the first filter unit 201, after the first filter unit 201 is cleaned; and directly open the first feeding solenoid valve 102 and the first discharging solenoid valve 301, close the second discharging solenoid valve 302, and turn off the ultrasonic generator 203; and open the second feeding solenoid valve 103 and the second discharging solenoid valve 302 if the self-cleaning mode of the first filter unit 201 is not about to be ended in a short period of time (less than 10 minutes); open, after the first filter unit is cleaned for 10-30 minutes, the blow-down solenoid valve 20106 to discharge the impurity cleaned inside the first filter unit 201 so as to complete cleaning; turn off the ultrasonic generator 203, and proceed to a mixed mode: close the second feeding solenoid valve 103, and open the first feeding solenoid valve 102, the first electronically-controlled on-off valve and the second discharging solenoid valve 302, such that the water filtered by the first filter unit enters the second feeding pipe through the first communication pipe to be filtered again by the second filter unit 202, and then flows out through the second discharging pipe; and open, after 1 minute, the first discharging solenoid valve 301, and close the first electronically-controlled on-off valve and the second discharging solenoid valve 302.

S5: Repeat Steps S2 to S4 by activating the second filter unit 202 when the pressure transmitter 305 again displays a value less than 0.06 MPa; and allow, after a half-year maintenance cycle, the first feeding solenoid valve 102 and the first discharging solenoid valve 301 to be responsible for opening and closing the first filter unit 201, and to be normally open by default; and allow the second feeding solenoid valve 103 and the second discharging solenoid valve 302 to be responsible for opening and closing the second filter unit 202, and to be normally closed by default.

In the present disclosure, in the filter unit, the ultrasonic vibration rod is matched with the hollow cylindrical filter screen and provided in the center of the filter screen, such that the ultrasonic wave is emitted into a ring, thereby enhancing the cleaning strength and uniformity of ultrasonic waves to the filter screen. The ultrasonic vibration rod is nested inside the upper filter casing through the externally-threaded hollow cap and the threaded top portion of the upper filter casing, which greatly facilitates the cleaning, replacement and maintenance of the ultrasonic vibration rod.

The present disclosure adds the controllable first communication pipe and the electronically controlled on-off valve on the basis of a traditional dual-channel filtration system. Therefore, one of the filter channels can be used for secondary filtration of part of the mixed liquid filled in the other filter channel after cleaning. In addition, the fluid pre-stored in the communication pipe can be used as a back-up drip irrigation liquid in case of emergency situation.

The present disclosure rotates the pressure regulating valve such that the pressure transmitter displays a value of 0.1 MPa, and determines that the filter is clogged when monitoring that the value of the pressure transmitter is less than 0.06 MPa. The present disclosure realizes the combined effect of each solenoid valve. In addition, the present disclosure operates two filter units alternately, which ensures the self-flushing function of the filter and greatly improves the operation stability of the biogas slurry drip irrigation system.

In Step S3, after the flow state of the second filter unit is stable, the first discharging solenoid valve and the first feeding solenoid valve are sequentially closed. This design facilitates filling the filter unit with water to ensure that the ultrasonic wave works properly and efficiently.

Although the embodiments of the present disclosure are described above, it should be understood that those of ordinary skill in the art may make various changes, modifications, replacements and variations to these embodiments without departing from the principle and spirit of the present disclosure, and the scope of the present disclosure is subjected to the appended claims and legal equivalents thereof.

What is claimed is:

1. A working method of an automatic flushing device for a screen filter of a biogas slurry drip irrigation system, wherein
   the automatic flushing device for the screen filter of the biogas slurry drip irrigation system comprises a feeding mechanism, a filter unit, a discharging mechanism and a control mechanism, wherein the filter unit is provided with a feeding end fixedly threaded to a discharging end of the feeding mechanism and a discharging end fixedly threaded to a feeding end of the discharging mechanism; and the control mechanism is clamped on a pipe of the feeding mechanism;
   the feeding mechanism comprises a main feeding pipe, a pressure regulating valve, a first feeding pipe, a second feeding pipe, a first feeding solenoid valve and a second feeding solenoid valve; the first feeding solenoid valve is fixedly connected to an outlet of the pressure regulating valve through a feeding tee joint; the second feeding solenoid valve is fixedly connected to one end of the feeding tee joint through a feeding elbow; the first feeding solenoid valve and the second feeding solenoid valve are arranged in parallel; and the first feeding solenoid valve and the second feeding solenoid valve are respectively connected to the first feeding pipe and the second feeding pipe;
   the filter unit comprises a first filter unit and a second filter unit; an ultrasonic generator is fixedly provided between the first filter unit and the second filter unit; and the first feeding pipe is connected to the first filter unit, and the second feeding pipe is connected to the second filter unit;
   the discharging mechanism comprises a first discharging pipe, a second discharging pipe, a main discharging pipe, a first discharging solenoid valve, a second discharging solenoid valve, a discharging elbow, a discharging tee joint and a pressure transmitter; the pressure transmitter is provided on the main discharging pipe; the first discharging solenoid valve and the second discharging solenoid valve are respectively connected to the first discharging pipe and the second discharging pipe; the first discharging pipe and the second discharging pipe are respectively connected to an input end of the discharging elbow and one input end of the discharging tee joint; the first discharging pipe further connects an output end of the discharging elbow to the other input end of the discharging tee joint; and an output end of the discharging tee joint is connected to the main discharging pipe;
   the control mechanism is electrically connected to the first feeding solenoid valve, the second feeding solenoid valve, the first discharging solenoid valve, the second discharging solenoid valve, the ultrasonic generator, the pressure transmitter, a blow-down solenoid valve and a first electronically-controlled on-off valve; the first feeding solenoid valve and the first discharging solenoid valve are responsible for opening and closing the first filter unit, and are normally open by default; and the second feeding solenoid valve and the second discharging solenoid valve are responsible for opening and closing the second filter unit, and are normally closed by default; and
   a first communication pipe for communicating the first discharging pipe with the second feeding pipe is provided between the first discharging pipe and the second feeding pipe; the first communication pipe is provided thereon with the first electronically-controlled on-off valve; a second communication pipe for communicating the second discharging pipe with the first feeding pipe is provided between the second discharging pipe and the first feeding pipe; and the second communication pipe is provided thereon with a second electronically-controlled on-off valve; the first filter unit has a same structure as the second filter unit; the first filter unit comprises an externally-threaded hollow cap, an ultrasonic vibration rod, an upper filter casing, a filter screen, a lower filter casing and the blow-down solenoid valve;
   the ultrasonic vibration rod is electrically connected to the ultrasonic generator, the lower filter casing is provided with a "cross-shaped" flow channel, in which a fluid entering from a water inlet flows from an inside out through the filter screen to a water outlet, and a drain outlet is communicated with the water inlet, the first electronically-controlled on-off valve and the second electronically-controlled on-off valve are each a solenoid valve, the ultrasonic vibration rod is arranged at a top portion of the upper filter casing;
   the working method comprises the following steps:
   S1: rotating the pressure regulating valve to make the pressure transmitter display a common working pressure 0.1 MPa of the biogas slurry drip irrigation system, that is, activating a filtering mode of the first filter unit while keeping the second filter unit in an idle mode; and opening the first feeding solenoid valve, and closing the second feeding solenoid valve, the second discharging solenoid valve, the first discharging solenoid valve and the ultrasonic generator;
   S2: opening the first electronically-controlled on-off valve for a certain period of time T; allowing, during the period of time T, a fluid filtered by the first filter unit to flow through the first discharging pipe, the first communication pipe and the second feeding pipe in sequence to fill the second filter unit and then enter the second discharging pipe, until the first communication pipe, the second feeding pipe, the second filter unit and the second discharging pipe are filled; opening the first discharging solenoid valve, such that all the fluid filtered by the first filter unit flows from the first discharging pipe into the main discharging pipe; and closing the first electronically-controlled on-off valve on the first communication pipe;

S3: determining that the first filter unit is clogged when the pressure transmitter displays a value less than a specific value 0.06 MPa set by the control mechanism; closing the first discharging solenoid valve and the first feeding solenoid valve in sequence, such that the upper filter casing of the first filter unit is filled with water; and turning on the ultrasonic generator to activate a self-cleaning mode of the first filter unit;

S4: opening, if the self-cleaning mode of the first filter unit is about to be ended in a short period of time (less than 10 minutes), the second discharging solenoid valve, such that the water originally filled through the first communication pipe flows out into the main discharging pipe for a subsequent drip irrigation without opening the first discharging solenoid valve; discharging, by the blow-down solenoid valve, an impurity cleaned inside the first filter unit, after the first filter unit is cleaned; then closing the blow-down solenoid valve; and opening the first feeding solenoid valve and the first discharging solenoid valve, closing the second discharging solenoid valve, and turning off the ultrasonic generator; and opening the second feeding solenoid valve and the second discharging solenoid valve if the self-cleaning mode of the first filter unit is not about to be ended in the short period of time (less than 10 minutes); opening, after the first filter unit is cleaned for 10-30 minutes, the blow-down solenoid valve to discharge the impurity cleaned inside the first filter unit; then closing the blow-down solenoid valve to complete cleaning; turning off the ultrasonic generator, and proceeding to a mixed mode: closing the second feeding solenoid valve, and opening the first feeding solenoid valve, the first electronically-controlled on-off valve and the second discharging solenoid valve, such that the water filtered by the first filter unit enters the second feeding pipe through the first communication pipe to be filtered again by the second filter unit, and then flows out through the second discharging pipe; and opening, after 1 minute, the first discharging solenoid valve, and closing the first electronically-controlled on-off valve and the second discharging solenoid valve; and S5: repeating steps S2 to S4 by activating the second filter unit when the pressure transmitter again displays the value less than 0.06 MPa; and allowing, after a half-year maintenance cycle, the first feeding solenoid valve and the first discharging solenoid valve to be responsible for opening and closing the first filter unit, and to be normally open by default; and allowing the second feeding solenoid valve and the second discharging solenoid valve to be responsible for opening and closing the second filter unit, and to be normally closed by default.

2. The working method according to claim 1, wherein a baffle diameter of the ultrasonic vibration rod is the same as an outer diameter of the externally-threaded hollow cap and a length of the ultrasonic vibration rod is the same as a length of the filter screen.

3. The working method according to claim 1, wherein the filter screen is inserted into a slot of the lower filter casing and extends to the top portion of the upper filter casing; and the filter screen has a mesh number of 120-150.

4. The working method according to claim 1, wherein the pressure transmitter is able to transmit a measurement signal wirelessly.

5. The working method according to claim 1, wherein the first communication pipe and the second communication pipe have a same bore diameter.

\* \* \* \* \*